Patented Feb. 6, 1923.

1,444,276

UNITED STATES PATENT OFFICE.

FRIEDRICH SAUER, OF GOTHA, GERMANY.

MANUFACTURE OF WINE-YEAST PREPARATION.

No Drawing.   Application filed August 18, 1921.   Serial No. 493,422.

*To all whom it may concern:*

Be it known that I, FRIEDRICH SAUER, citizen of the Republic of Germany, residing at Gotha, Germany, have invented certain new and useful Improvements in the Manufacture of Wine-Yeast Preparations, of which the following is a specification.

The invention relates to a new method of making a yeast preparation for use in the manufacture of wines and similar alcoholic liquids. Yeast of this kind which will hereinafter be called wine-yeast, is an article of trade and is usually dispensed and shipped in bottles containing the yeast in a nutritive liquor rich in sugar. The bottles, as a rule, are duly sealed but only partially filled to allow the yeast to grow, that is to say, to breed, whereby the sugar contained in the liquor is decomposed and carbonic acid developed, so that, if the seal gives way, part of the yeast will flow out or, if the seal holds, the bottles are liable to burst.

Bottles that reach their place of destination free of any injury are relatively few and great skill is required for opening such a bottle without losing its contents, a portion of the contents is liable to be lost by squirting.

To avoid the losses it has been suggested to soak wadding or cotton-wool with the yeast-liquor and to enclose the soaked cotton in wide-mouthed bottles for the trade. For use the yeast is to be separated from the cotton by washing or in any other suitable manner. This method is applicable in the cold season and for sending a short distance only, whilst in the hot season or for shipping long distance be followed without damage, since the liquor always contains some alcohol which decomposes at higher atmospheric temperatures or on long travels under the action of certain germs to yield acetic acid which renders the yeast useless for the making of wine.

The new method of producing a reliable yeast preparation adapted to stand higher temperatures and long travels is based upon certain natural phenomena. Dried fruits such as raisins, contain, if they have been dried at atmospheric temperature, a large amount of living yeast cells or germs which had been present also before on the fresh, undried grape. Hereinafter, the term "yeast germs" will be used as including both the cells, germs (spores) etc., of yeast and like organisms.

Said yeast cells lead a poor life on the dried fruits though the latter is a good medium for the culture of such cells owing to its richness in sugar and salts. The yeast, however, remains on the dried fruits in a very pure state, since impurities such as acetic germs, that is to say germs apt to produce acetic acid in alcoholic liquids, cannot spread thereon for the reason that they grow only in liquids containing a certain percentage of alcohol.

Besides grapes and also any other fruits which have been dried at low or atmospheric temperatures, contain the yeast germs or cells of the fruits of the locality where they have grown, e. g. plums, bilberries, hips (the fruit of rose bushes) and the like.

The trade does not care for obtaining such casual yeast of various descent but a pure wine-yeast of a certain origin is wanted. To this end such wine-yeast can be cultivated on the above mentioned or any other sugary fruits and subsequently preserved as a pure culture in the following manner by—

1. Destroying the yeast cells originally on the dried fruits by heating.

2. Moistening or inoculating the thus sterilized fruits with a liquid containing pure wine-yeast cells from the desired sort of grapes and 3. Drying the thus prepared fruits at atmospheric temperatures and, if possible, in a sterilized air current.

In the following description a few examples of the mode of carrying out the new method practically will be given, for illustration.

Succulent fruits such as grapes (raisins), bilberries and the like are, while being gathered from the trees or plants, damaged more or less and they are also sometimes injured during the drying operation, so that they lose a portion sugar and salts which, therefore condenses or solidifies by drying on the fruit. Fruits of this succulent kind may be used for the production of a wine-yeast preparation according to the present method without any necessity of being first cut to pieces.

Fruits, however, which has but little juice such as hips and the like, usually are not damaged in being gathered and dried. Fruits of this kind, therefore preferably are cut to pieces and the pips are removed therefrom before they are further treated in accordance with the present invention. In the operation of moistening the fruits with the liquor containing sugar and pure wine-yeast, the fruits which have been cut to pieces absorb more liquid than uncut fruits, as the said liquor not only moisten the outer face of the fruit, but also enters the pulp thereof, so that fruits that have but little juice still represent a satisfactory medium for the culture of wine-yeast.

As soon as the fruits have been moistened with the wine-yeast liquor, the yeast cells commence to grow and breed rapidly. This growth or generation of new yeast cells continues until, in the drying operation, the yeast liquid dries up and becomes viscous, so that the yeast cells do not any longer find therein the conditions for further growth or generation, (just as it is the case in drying, for preserving purposes fresh fruits that have not been treated with a yeast culture liquid).

The yeast culture liquid to be used in the new method is not always of the same composition or character. In case of succulent fruits rich in sugar, preferably a liquid is employed that contains or may contain less sugar than in other cases where the fruit is poor in juice and sugar. In the latter case the culture liquid is given a higher percentage of sugar and the fruits are moistened therewith more profusely to make ample compensation for their natural poorness in juice, so that they still afford a good medium for the culture of yeast cells and the latter find all the conditions needed for further growth and generation.

The sugar to be used for the liquid yeast preparation preferably belongs to the kind of sugars that readily decompose by fermentation, such as invert-sugar, grape-sugar or dextrose, starch-sugar or glucose, whereas ordinary cane-sugar is to be avoided.

Exhaustive experiments and trials have shown that fruits treated in the manner above described are capable of being kept for a long time, thereby preserving the yeast cultures as a pure culture, not only for a short time but even for long periods, even for several years. The yeast thus preserved on the dried fruits, maintains its full germinative faculty so that when, at any time, the prepared or treated fruits are moistened or added to sugar-containing liquid or wine, the yeast cells or germs thereon begin at once to grow and propagate just as if they had originally and naturally settled on the fruits.

The herein described method of making a wine-yeast preparation is of greatest importance not only for shipping, but also for reasons of preservation, since large quantities of useful sorts of yeast can thus be kept and preserved on dried fruits in a pure state without any tedious or time consuming work, so that the new method is also an advance in the art from an economical point of view.

I claim:

1. A method of producing a durable wine-yeast preparation, consisting in sterilizing sacchariferous fruits by heating to kill any foreign germs or cells that may be carried thereon, moistening the thus sterilized fruits with a liquor containing wine-yeast and drying the moistened fruits at atmospheric temperatures.

2. A method of producing a durable wine-yeast preparation, consisting in drying sacchariferous fruits, heating same at a comparatively high temperature to kill any foreign germs that may be carried thereon, moistening the thus sterilized fruits with a liquor containing wine-yeast and drying the moistened fruits at a comparatively low temperature.

3. As an article of manufacture a wine-yeast preparation consisting of dried fruits and wine-yeast germs of a selected sort, the former serving as a carrier for the latter.

4. As an article of manufacture a wine-yeast preparation consisting of comminuted, dried sugar-containing fruits and wine-yeast germs of a selected sort, the former serving as a carrier of the latter.

In testimony whereof I affix my signature in presence of two witnesses.

FRIEDRICH SAUER.

Witnesses:
CARL SCHLEMBAST,
ALFRED DAMME.